United States Patent
Lancaster

(10) Patent No.: US 7,698,213 B2
(45) Date of Patent: Apr. 13, 2010

(54) METHOD OF RISK MODELING BY ESTIMATING FREQUENCIES OF LOSS AND LOSS DISTRIBUTIONS FOR INDIVIDUAL RISKS IN A PORTFOLIO

(75) Inventor: Clifton J. Lancaster, Avon, CT (US)

(73) Assignee: The Hartford Steam Boiler Inspection and Insurance Co., Hartford, CT (US)

( * ) Notice: Subject to any disclaimer, the term of this patent is extended or adjusted under 35 U.S.C. 154(b) by 665 days.

(21) Appl. No.: 11/323,252

(22) Filed: Dec. 30, 2005

(65) Prior Publication Data
US 2007/0043656 A1 Feb. 22, 2007

Related U.S. Application Data

(60) Provisional application No. 60/709,634, filed on Aug. 19, 2005.

(51) Int. Cl.
*G06Q 40/00* (2006.01)
(52) U.S. Cl. ................................................ 705/38
(58) Field of Classification Search ............... None
See application file for complete search history.

(56) References Cited

U.S. PATENT DOCUMENTS

| | | | |
|---|---|---|---|
| 7,072,841 B1 * | 7/2006 | Pednault | 705/4 |
| 7,228,290 B2 * | 6/2007 | Browne et al. | 705/36 R |
| 2002/0099596 A1 * | 7/2002 | Geraghty | 705/10 |
| 2003/0014356 A1 * | 1/2003 | Browne et al. | 705/38 |
| 2004/0260703 A1 * | 12/2004 | Elkins et al. | 707/100 |
| 2005/0065754 A1 * | 3/2005 | Schaf et al. | 702/188 |
| 2006/0173663 A1 * | 8/2006 | Langheier et al. | 703/11 |
| 2006/0235783 A1 * | 10/2006 | Ryles et al. | 705/35 |

OTHER PUBLICATIONS

Pai, J. S., "Bayesian analysis of compound loss distributions", Oct. 1, 1995, Journal of Econometrics.*

* cited by examiner

*Primary Examiner*—Olabode Akintola
(74) *Attorney, Agent, or Firm*—McCormick, Paulding & Huber LLP

(57) ABSTRACT

A method of predictive modeling is for purposes of estimating frequencies of future loss and loss distributions for individual risks in an insurance portfolio. To forecast future losses for each individual risk, historical data relating to the risk is obtained. Data is also obtained for other risks similar to the individual risk. Expert opinion relating to the risk is also utilized for improving the accuracy of calculations when little or no historical data is available. The historical data, any current data, and expert opinion are combined using a Bayesian procedure. The effect of the Bayesian procedure is to forecast future losses for the individual risk based on the past losses and other historical data for that risk and similar risks. Probability distributions for predicted losses and historical data for use in the Bayesian procedure are obtained using a compound Poisson process model.

10 Claims, 3 Drawing Sheets

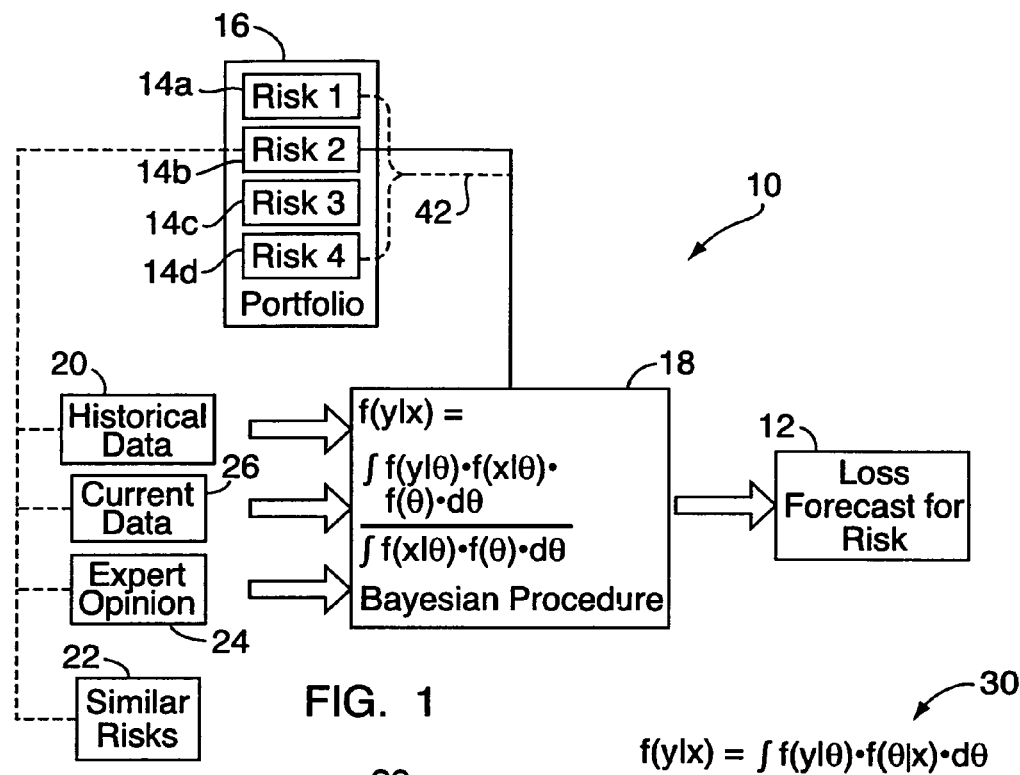

FIG. 1

$$f(y|x) = \frac{\int f(y|\theta) \cdot f(x|\theta) \cdot f(\theta) \cdot d\theta}{\int f(x|\theta) \cdot f(\theta) \cdot d\theta}$$

FIG. 3A $$f(\theta|x) = \frac{f(x|\theta) \cdot f(\theta)}{f(x)} ; \quad f(x) = \int f(x|\theta) \cdot f(\theta) d\theta$$

FIG. 3C $$Z = \sum_{i=0}^{N} (X_i - \text{deductible})_t$$

FIG. 3E $$f(y|x) = \int f(y|\theta) \cdot f(\theta|x) \cdot d\theta$$

FIG. 3B $$N(t) \quad \{Y(t) : t \geq 0\};$$
$$Y(t) = \sum_{i=0}^{N(t)} X_i; \quad \{N(t) : t \geq 0\};$$
$$\{D_i : i \geq 0\};$$

FIG. 3D $$E(Z) = E\left(\sum_{i=0}^{N} (X_i - \text{deductible})_t\right)$$
$$= E(N) \, E\left((X - \text{deductible})_t\right)$$

FIG. 3F $$f(\text{future losses}|\text{past losses}) = \frac{\int f(\text{future losses}|\theta) \cdot f(\text{past losses}|\theta) \cdot f(\theta) \cdot d\theta}{\int f(\text{past losses}|\theta) \cdot f(\theta) \cdot d\theta}$$

FIG. 3G $$p(\text{future}_i|\text{past losses}) = \frac{\int p(\text{future}_i|\theta) \cdot p(\text{past losses}_{ALL}|\theta) \cdot p(\theta) \cdot d\theta}{\int p(\text{past losses}_{ALL}|\theta) \cdot p(\theta) \cdot d\theta}$$

FIG. 3H $$p(cl1|cv1,rm1,ev1,cl0,cv0,rm0,ev0) =$$

$$\frac{\int p(cl1|cv1,rm1,ev1,cl0,cv0,rm0,ev0,\theta)\cdot p(cl0|cv1,rm1,ev1,cv0,rm0,ev0,\theta)\cdot p(\theta|cv1,rm1,ev1,cv0,rm0,ev0)d\theta}{\int p(c0|cv1,rm1,ev1,cv0,rm0,cv0,\theta)\cdot p(\theta|cv1,rm1,ev1,cv0,cv0)d\theta}$$

FIG. 4A $$\frac{\int p(cl1|cv1,rm1,ev1,\theta)\cdot p(cl0|,cv0,rm0,ev0,\theta)\cdot p(\theta)d\theta}{\int p(c|cv0,rm0,cv0,\theta)\cdot p(\theta)d\theta}$$

FIG. 4B $$\frac{\exp(-z\lambda)(z\lambda)^N}{N!} f(x_1)f(x_2)...f(x_N)$$

FIG. 4C

METHOD OF RISK MODELING BY ESTIMATING FREQUENCIES OF LOSS AND LOSS DISTRIBUTIONS FOR INDIVIDUAL RISKS IN A PORTFOLIO

This application claims the benefit of U.S. Provisional Application Ser. No. 60/709,634, filed Aug. 19, 2005.

FIELD OF THE INVENTION

The present invention relates to data processing and, more particularly, to an automated electrical financial or business practice or management arrangement for insurance.

BACKGROUND OF THE INVENTION

Generally speaking, commercial insurance is a form of risk allocation or management involving the equitable transfer of a potential financial loss, from a group of people and/or other entities to an insurance company, in exchange for a fee. Typically, the insurer collects enough in fees (called premiums) from the insured to cover payments for losses covered under the policies (called claims), overhead, and a profit. Each insured property or item, such as a plot of land, a building, company, vehicle, or piece of equipment, is typically referred to as a "risk." A grouping of risks, e.g., all the properties insured by an insurer or some portion thereof, is called a "portfolio."

At any particular point in time, each portfolio of risks has an associated set of past claims and potential future claims. The former is a static, known value, while the latter is an unknown variable. More specifically, for a given portfolio in a given time period, e.g., one year, there may be no claims or a large number of claims, depending on circumstances and factors largely outside the insurer's control. However, to set premiums at a reasonable level, it is necessary to predict or estimate future claims, i.e., from the insurer's perspective it is beneficial to set premiums high enough to cover claims and overhead but not so high as would drive away potential customers. This process of mathematically processing data associated with a risk portfolio to predict or estimate future loss is called "risk modeling." Traditionally, this has involved using actuarial methods where statistics and probability theory are applied to a risk portfolio as a whole (i.e., with the risks grouped together), and taking into consideration data relating to overall past performance of the risk portfolio.

While existing, actuarial-based methods for risk modeling in the insurance industry are generally effective when large amounts of data are available, they have proven less effective in situations with less on-hand data. This is because the data curves generated with such methods, which are used to estimate future losses, are less accurate when less data is present—in estimating a curve to fit discreet data points, the greater the number of data points, the more accurate the curve. Also, since portfolios are considered as a whole, there is no way to effectively assess individual risks using such methods.

SUMMARY OF THE INVENTION

An embodiment of the present invention relates to a method of predictive modeling for estimating frequencies of future loss and loss distributions for individual risks in an insurance portfolio. By "individual risk," it is meant a single insured property (e.g., a building, item of equipment, vehicle, company, person, or parcel of land). The method may be implemented as a system using a computer or other automated data processing or calculation device.

To forecast future losses for each individual risk, historical data relating to the risk is obtained. Historical data includes any known or existing information relevant to the risk, such as past recorded losses, terms and conditions of insurance policies, and risk characteristics, such as value, occupancy, and address or other location information. In addition, historical data from other risks similar to the individual risk may be obtained and utilized. Especially where limited data is available for the individual risk, this provides a much larger data sample. Expert opinion relating to the risk is also utilized for improving the accuracy of calculations when little or no historical data is available—when historical data is unavailable, the expert opinion dominates the predictive calculation. The expert opinion is typically provided as (or expressed as part of) a mathematical function that defines a probability distribution of some aspect of the individual risk or a related or similar risk. In other words, the expert opinion is a mathematically expressed "educated guess" of one or more characteristics of the individual risk that provides a baseline when little or no historical data is present. For example, if the individual risk in question is a building, the expert opinion might be a function setting forth an estimation (or probability distribution) of an expected frequency and/or severity of loss for that type or category of building.

The historical data, any current data (meaning data newly obtained about the individual or other risks after the method is implemented), and expert opinion are combined using a Bayesian procedure. The effect of the Bayesian procedure is to forecast future losses for the individual risk based on the past losses and other historical data for that risk and similar risks. At the heart of the Bayesian procedure is a Bayesian predictive model, wherein a posterior probability distribution of forecast losses for the individual risk, given the historical data, is represented as an integral function of: (i) a probability distribution of the predicted losses given a system parameter set, i.e., a predicted loss likelihood function; (ii) the probability distribution of the historical data given the parameter set, i.e., an historical data likelihood function; and (iii) a prior probability density function of the parameter set.

The probability distributions for the predicted losses and historical data (for use in solving or approximating the Bayesian predictive model) are obtained using a compound Poisson process model. In particular, to accommodate heterogeneity, losses for the risk are modeled as a finite mixture of compound Poisson processes. The parameters of the compound Poisson process are the underlying rate of loss and a severity distribution of the losses. These will depend on the characteristics of the risk, such as value and historical loss. Additionally, the prior probability density function of the parameter set is obtained from (or as) the expert opinion.

Once the probability distributions for the predicted losses and historical data and the prior distribution of the parameter set have been specified, the posterior probability distribution of predicted losses is obtained by solving the Bayesian predictive model. This produces a probability distribution for the predicted claims for each risk and each type of loss in the future portfolio, given coverage assumptions. To solve or approximate the predictive model, numerical techniques are typically required, such as the Markov Chain Monte Carlo simulation method.

As current data is obtained, it may be incorporated into the calculations/system for increasing accuracy. Also, for each individual risk, the method may be used to produce breakdowns of forecasted expected loss by type of loss, a forecasted probability distribution of losses, a calculation of the effect of changing limits, deductibles, and coinsurance on the loss forecast, and a forecasted expected loss ratio, given an input premium. The method may also be used to produce joint probability distributions of losses for risks considered jointly.

BRIEF DESCRIPTION OF THE DRAWINGS

The present invention will be better understood from reading the following description of non-limiting embodiments, with reference to the attached drawings, wherein below:

FIG. 1 is a schematic diagram of a system and method of predictive modeling for estimating frequencies of future loss and loss distributions for individual risks in an insurance portfolio, according to an embodiment of the present invention;

FIGS. 3A-3H and 4A-4C show various equations used in carrying out the method.

DETAILED DESCRIPTION

Figure 2:
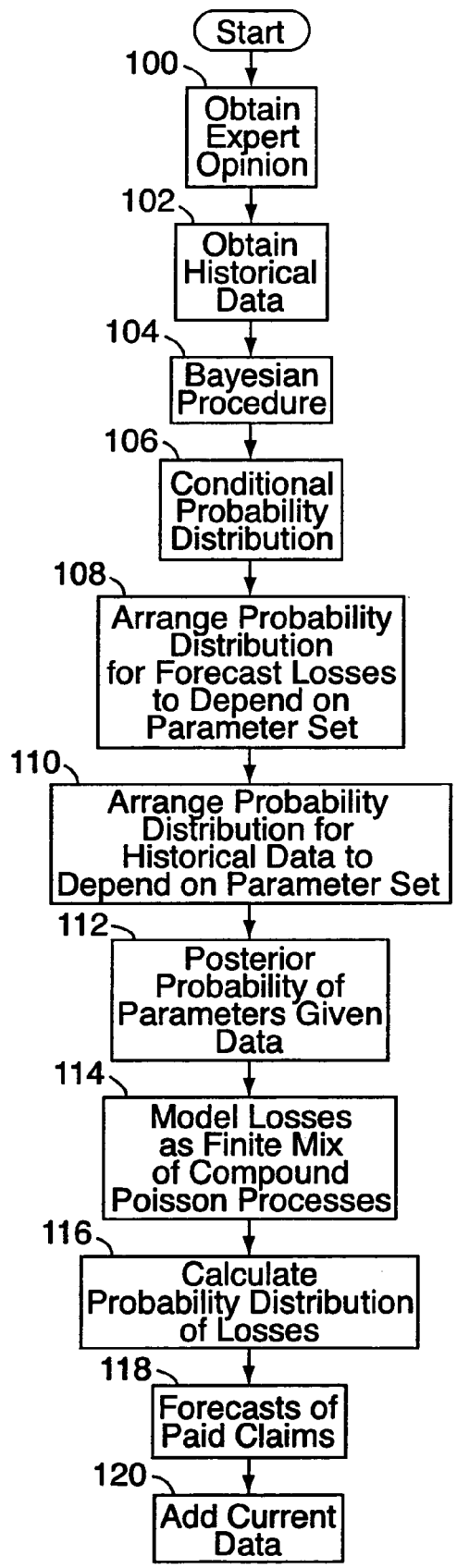
FIGS. 2 and 5 are flow charts showing the steps of the method in FIG. 1.

With reference to FIGS. 1-5, an embodiment of the present invention relates to a method or system 10 of predictive modeling for generating a forecast of expected loss 12 for individual risks 14a, 14b, 14c, 14d, etc. in an insurance portfolio 16. Typically, this will be done for insurance-related purposes, for determining premium levels and the like. By "individual risk," as noted above, it is meant a single insured or insurable property such as a building, item of equipment, vehicle, company/business, person, operation/manufacturing line, or parcel of land. (The method is also applicable to individual risks grouped together.) For generating the loss forecast 12, the method uses a Bayesian procedure 18 that incorporates historical data 20 relating to the individual risk 14b in question. The historical data 20 will typically comprise information somehow relevant or related to the risk, and may include any of the following: recorded losses for the risk, with date, amount and type of loss, for a given loss basis (such as paid or incurred); the period during which the risk was exposed to recorded losses, namely, the effective and expiration dates of any policies applying to the risk; the terms and conditions of the policies applying to the risk, principally deductible, limit, and coinsurance; and various characteristics of the risk. For example, for a building such characteristics could include value, occupancy, construction type, and address/location.

The Bayesian procedure 18 also utilizes historical data 20 relating to similar risks 22. By "similar risk," it is meant a risk other than the individual risk 14b that has some logical connection or relationship thereto, such as features or characteristics in common, at least in a general sense. For example, if the individual risk 14b is a hospital, then similar risks could include other hospitals, other medical facilities, or even other buildings within a relevant (i.e., the same or similar) geographic area. The similar risks may be risks within the portfolio 16, but do not have to be. As should be appreciated, the historical data from the similar risks provides a significantly larger data pool than just the historical data for the individual risk 14b by itself. It is relevant to the loss forecast for the individual risk 14b because data from a similar risk will typically tend to have some bearing on the individual risk, i.e., from a statistical or probabilistic standpoint, similar risks will likely experience similar losses over time. For example, if all the hospitals over a certain size in a particular area experience at least a certain amount of loss in a given period, such information will tend to increase the probability that a similar hospital in the same area will also experience at least the same loss.

Expert opinion 24 relating to the individual risk 14b is also obtained and utilized as part of the Bayesian procedure 18 calculations. The expert opinion 24 acts as a baseline for calculating the loss forecast 12 when little or no historical data 20 is available. Thus, where historical data is unavailable, the expert opinion 24 dominates the predictive calculation. The expert opinion 24 is provided as (or expressed as part of) a mathematical function or model that defines an estimated probability distribution of some aspect of the individual risk 14b or a related or similar risk 24. Typically, for inclusion in the Bayesian procedure calculations, this will be a prior probability distribution function of a system parameter set relating to one or more risk propensities. As its name implies, the expert opinion 24 may be obtained from professionals in the field who have studied some aspect of the individual or similar risks in question. Expert opinion may also be obtained from reference works. For a particular portfolio, the expert opinion may collectively include input from a number of professional sources, each of which relates to one or more aspects of the individual or similar risks. In other words, when implementing the method 10, it may be the case that a number of different functions/models are obtained and utilized as expert opinion, to more fully characterize the individual or similar risks in the Bayesian procedure 18.

As an example, in a simple case where all the risks in a portfolio are generally the same except for value, a propensity or tendency of such risks, e.g., a frequency of loss, might be characterized by the following probability distribution:

frequency of loss=$c \cdot (v/v_0)^b$, where

"c" and "b" are system parameters v=value $v_0$=reference size/value

Here, the equation itself might be considered expert opinion, e.g., obtained from a professional/expert or reference work, as might the range of values for the system parameters c and b. For example, given the equation and system parameters, an expert might be consulted to provide values for c and b that give the highest probability to fit the data. Thus, expert opinion might be solicited for selecting the best model based on the type of data to be modeled, as well as the best system parameters given a particular model.

For the Bayesian procedure 18, current data 26 may also be obtained and utilized. "Current" data 26 is the same as historical data but is instead newly obtained as the method 10 is carried out over time. For example, if an individual risk 14b experiences a loss after the method/system 10 has been implemented initially, then information about this loss may be entered into the system 10 as current data 26.

FIG. 2 summarizes the steps for carrying out the method 10 for forecasting the future losses 16 for an individual risk 14b. As discussed further below, these steps may be performed in a different order than as shown in FIG. 2, e.g., it will typically be the case that expert opinion is obtained after first establishing a predictive model. At Step 100, the expert opinion 24 relating to the individual risk 14b and/or similar risks 22 is obtained. Then, at Step 102, the historical data 20, again relating to the individual risk and/or similar risks 22 is obtained. If historical data 20 is not available, then this step will be bypassed until historical and/or current data become available. In such a case, the Bayesian procedure 18 is carried out with the expert opinion 24 only, which, as noted above, acts as an estimation or baseline.

At Step 104 in FIG. 2, the historical data 20, any current data 26, and expert opinion 24 are combined using the Bayesian procedure 18. The effect of the Bayesian procedure 18 is to forecast the future losses 12 for the individual risk 14b based on the past losses and other historical data 20 for that risk 14b and similar risks 22. Typically, the Bayesian procedure 18 will utilize a Bayesian predictive model as shown by equation 28 in FIG. 3A. In equation 28, a predictive conditional probability distribution "f(y|x)" of forecast or future losses ("y") for all risks jointly, given all historical data or past losses ("x"), is represented in terms of: (i) a probability distribution "f(y|θ)" of the forecast losses y given a system parameter set "θ", e.g., a forecast losses likelihood function; (ii) a probability distribution "f(x|θ)" for the historical data, e.g., an historical data likelihood function; and (iii) a prior probability density function of the parameter set (risk propensities) "f(θ)", e.g., probability distributions of the system parameters as elicited from expert opinion or the like. (θ represents unknown system parameters that characterize all the risks, such as the probability of a claim of a certain type or at a certain location.)

Equation 29 in FIG. 3G is the same as equation 28 in FIG. 3A, except showing how "x" and "y" correspond to the past losses/data and forecast/future losses, respectively, for illustration purposes.

Equation 28 in FIG. 3A is generally applicable in carrying out the method 10. This equation is derived with reference to Steps 106-112 in FIG. 2, provided for informational purposes. To derive equation 28, at Step 106, the conditional probability distribution f(y|x) of forecast losses y for the individual risk 14b, given all historical data x, is represented as a weighted sum of probability distributions, as shown by equation 30 in FIG. 3B. The weighted sum may be an integral of the probability distribution f(y|θ) of the forecast losses y given the system parameter set θ times a parameter set weight "f(θ|x)." Here, the parameter set weight f(θ|x) is a posterior probability density function of the system parameters θ given the historical data x. Equation 30 is a standard equation for the predictive distribution of a random variable of interest y given observed data x.

At Step 108, the probability distributions f(y|θ) for forecast losses y are arranged to depend on the parameter set θ, indexed by an index "i". At Step 110, the probability distributions f(x|θ) for historical data are also arranged to depend on the same parameter set θ, also indexed by the index "i". For example, if $x_i$ is data for a risk "i", then $$f(x_i|\theta) = f(x_1|\theta) \cdot f(x_2|\theta) \ldots$$

This is true using a conditional independent model. Non-independent models can also be used. Next, at Step 112, the posterior probability density function f(θ|x) is calculated as the probability distribution of the historical data given the parameter set f(x|θ), times the prior probability of the parameter set f(θ). This is shown as equations 32 in FIG. 3C (these equations are standard representations of Bayes' theorem for probability densities). Thus, combining equations 30 and 32, the conditional probability distribution f(y|x) of forecast losses y for the individual risk 14b, given all historical data x, is as shown by equation 28 in FIG. 3A. This can be further represented by:

$$f(y|x) = f(y|\theta_1) \cdot p(\theta_1) + f(y|\theta_2) \cdot p(\theta_2) + \ldots$$

where each "p" is the probability of the particular respective system parameter θ.

Starting with the predictive model 28 (FIG. 3A), the probability distributions f(y|θ) and f(x|θ) are obtained for the forecast losses y and historical data x, respectively, using a compound Poisson process model. Generally speaking, a Poisson process is a stochastic process where a random number of events (e.g., losses) is assigned to each bounded interval of time in such a way that: (i) the number of events in one interval of time and the number of events in another disjoint (non-overlapping) interval of time are independent random variables, and (ii) the number of events in each interval of time is a random variable with a Poisson distribution. A compound Poisson process is a continuous-time stochastic process "Y(t)" represented by equation 34 in FIG. 3D, where Y(t) represents the aggregate loss, "N(t)" is a Poisson process (here, the underlying rate of losses), and "$X_i$" are independent and identically distributed random variables which are also independent of "N(t)" (here, $X_i$ represents the severity distribution of the losses). If full knowledge of the characteristics of a risk 14b were available, historical and forecast losses for that risk could be approximated by a compound Poisson process, in which losses for each type of loss occur according to a Poisson process, and where the size of "ground-up" loss is sampled from a severity distribution depending on the type of loss (ground-up loss refers to the gross amount of loss occurring to a reinsured party, beginning with the first dollar of loss and after the application of deductions). Here, in order to accommodate heterogeneity in a class of similar risks because full knowledge of a risk's characteristics may not be available, losses for each risk are modeled as a finite mixture of compound Poisson processes, as at Step 114 in FIG. 2. As noted, the parameters of the compound Poisson process will typically be the underlying rate of losses (N(t)) and the severity distribution ($X_i$) of the ground-up losses, which depend on the known characteristics 20 of the risk 14b. In the case of a building, such characteristics will typically include value, occupancy, construction type, and address, and they may also include any historical claims/losses for that risk.

At Step 116, the probability distribution f(y|x) is calculated or approximated to produce the probability distribution of losses 12 for the forecast period for the individual risk 14b. With respect to equation 28 in FIG. 3A, the expert opinion from Step 100 is incorporated into the equation as the prior probability density function f(θ). Then, at Step 118, forecasts of paid claims for the individual risk 14b may be obtained by applying limits and deductibles to the forecast of losses 12 for that risk 14b. Generally, gross loss "Z" (see equation 36 in FIG. 3E) can be represented as the sum of losses "$x_i$" from i=1 to N, where "N" is a frequency of loss, but where each loss x is reduced by any applicable deductibles. Thus, the final outcome of the system 10 is represented as shown in equations 38 and 40 in FIG. 3F. At Step 120, current data 26 may be incorporated into the method/system 10 on an ongoing manner.

For each individual risk 14a-14d, the method 10 may also be used to produce breakdowns of forecasted expected loss by type of loss, a forecasted probability distribution of losses, a calculation of the effect of changing limits, deductibles, and coinsurance on the loss forecast, and a forecasted expected loss ratio, given an input premium. The method 10 may also be used to produce joint probability distributions of losses for a forecast period for risks considered jointly, as indicated by 42 in FIG. 1. Equation 43 in FIG. 3H shows an example of how the Bayesian predictive model (equation 28 in FIG. 3A) applies to a predictive equation for the future losses of an individual risk "i" given all past data/losses "Past Losses$_{All}$".

The above-described Bayesian procedure for estimating the parameters of a compound Poisson process for the purpose of predictive risk modeling will now be described in greater detail.

For a portfolio 16, the ultimate aim of the predictive model should be to produce a probability distribution for the timing and amounts of future claims, by type of claim, given the information available at the time of the analysis, i.e., the historical data 20 as well as other information. This information will generally include: (i) past claims; (ii) past coverages, including effective dates, expiration dates, limits, deductibles, and other terms and conditions; (iii) measurements on past risk characteristics such as (in the case of property coverage) construction, occupancy, protection, and exposure characteristics, values, other survey results, and geographic characteristics; (iv) measurements on past environmental variables, such as weather or economic events; (v) future coverages (on a "what-if" basis); (vi) measurements on current risk characteristics; and (vii) measurements on current and future environmental variables. Future environmental variables can be treated on a what-if basis or by placing a probability distribution on their possible values. For simplicity, it may be assumed (as herein) that current and future environmental variables are treated on a what-if basis.

In the formulas discussed below, the following abbreviations are used:

cl1=future claims occurring in the period $t_0$ to $t_1$ cv1=actual or contemplated future coverages for the period $t_0$ to $t_1$ rm1=measurements on risk characteristics applicable to the period $t_0$ to $t_1$ ev1=assumed environmental conditions for the period $t_0$ to $t_1$ cl0=future claims occurring in the period $t_{-1}$ to $t_0$ (or more generally, for a specified past period)

cv0=actual past coverages for the period $t_{-1}$ to $t_0$ rm0=measurements on risk characteristics applicable to the period $t_{-1}$ to $t_0$ ev0=environmental conditions for the period $t_{-1}$ to $t_0$ The probability distribution for the timing and amounts of future claims, by type of claim, given the information available at the time of the analysis, can be written as:

p(cl1|cv1,rm1,ev1,cl0,cv0,rm0,ev0)

where "p" denotes a conditional probability function or probability density where the variables following the bar are the variables upon which the probability is conditioned, i.e., a probability density of cl1 given variables cv1, rm1, ev1, cl0, cv0, rm0, and ev0. (It should be noted that this is a more detailed rendering of the more generalized conditional probability distribution "f(y|x)" noted above.) Construction of the predictive model begins by introducing the set of system parameters, collectively denoted by θ, which relate to the risk propensities of the risks 14a-14d in the portfolio 16. A standard probability calculation results in equation 50 as shown in FIG. 4A. (Again, it may be noted that equation 50 is a more detailed equivalent of equation 28 in FIG. 3A and equation 29 in FIG. 3G.) Equation 50 is true regardless of the assumptions of the model.

The model assumptions now introduced are as follows. Firstly, p(cl1|cv1,rm1,ev1,cl0,rm0,ev0,θ)=p(cl1|cv1,rm1,ev1,θ)

which expresses the assumption that if the loss/risk propensities θ are known, the future claims for the portfolio depend only on the current and future coverages, risk measurements, and environmental variables, and not on the past claims and other aspects of the past. The validity of this assumption depends on the ability to construct a model that effectively captures the information from the past in terms of knowledge about risk propensities. Secondly, p(cl0|cv1,rm1,ev1,cv0,rm0,ev0,θ)=p(cl0|cv0,rm0,ev0,θ)

which expresses the assumption that, provided that past coverages, risk measurements, and environmental variables are known, knowing future values for these quantities is irrelevant when considering the likelihood of past claims data. This assumption does not exclude the case in which present risk measurements can shed light on past risk characteristics, for example when a survey done more recently sheds light on risk characteristics further in the past. Thirdly, p(θ|cv1,rm1,ev1,cv0,rm0,ev0)=p(θ)

which expresses the assumption that the prior probability distribution for the risk propensities p(θ) does not depend on additional information. The risk propensities can be expressed in such a way that this assumption is valid, for example by assigning prior probability distributions of risk propensity to classes and types of risks, rather than to individual risks.

Given these three assumptions, the predictive model can be written as equation 52 in FIG. 4B.

Figure 5:
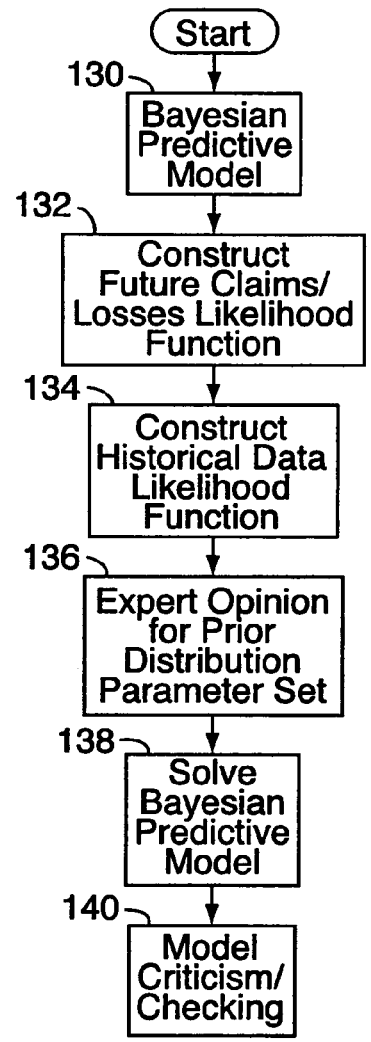

The Bayesian model estimation process includes the following steps, as shown in FIG. 5. Starting with the model from equation 52 in Step 130, the future claims/losses likelihood function p(cl1|cv1, rm1, ev1, θ) is constructed at Step 132. At Step 134, the past claims (historical data) likelihood function p(cl0|cv0, rm0, ev0, θ) is constructed. At Step 136, expert opinion is obtained for the prior distribution for risk propensities p(θ). Next, at Step 138, the outcome of the Bayesian predictive model is determined (meaning that the predictive model is solved or approximated). Step 140 involves model criticism and checking.

The past and future claims likelihood functions may be constructed as follows (in the basic case). Conditional on a fixed and known value for θ, claims are considered to be generated by a multivariate compound Poisson process, in which ground-up losses occur according to a Poisson process with rate λ (i, j) for risk "i" and type of loss "j" (as noted above, the risk 14a-14d could be a building, an establishment, or any other specific entity within the portfolio 16). The ground-up loss amounts are considered to be generated independently from a loss distribution F(i, j) again depending on risk i and type of loss j. Both λ (i, j) and F(i, j) depend on risk measurements for risk i and environmental variables, in such a way that $\lambda_{Past}(i,j)=g_j$(past risk measurements for $i$,past environmental variables,θ)

$\lambda_{Future}(i,j)=g_j$(current risk measurements for $i$,current environmental variables,θ)

$F_{Past}(i,j)=h_j$(past risk measurements for $i$,past environmental variables,θ)

$F_{Future}(i,j)=h_j$(current risk measurements for $i$,current environmental variables,θ)

The functions $g_j$ and $h_j$ are known functions that are designed to produce a flexible set of representations for the way in which the loss process for a risk depends on the characteristics of a risk and environmental variables. A hypothetical example could be $$g_j(\text{past risk measurements for } i, \text{past environmental variables}, \theta) = \frac{\exp(a_0 + a_1 \ln(x_1) + a_2 x_2 + \dots)}{\text{for occupancy} = A,} \quad \text{region} = X, \dots$$

$$= \frac{\exp(b_0 + b_1 \ln(x_1) + b_2 x_2 + \dots)}{\text{for occupancy} = B,} \quad \text{region} = X, \dots$$

where $x_1$=square footage, $x_2$=mean winter temperature for location, . . . .

In this case $a_0, a_1, a_2, b_0, b_1, b_2, \dots$ are all elements of the collection of parameters that is denoted by $\theta$.

The basic model makes the assumption that the past risk propensities equal the future risk propensities, and the functions linking the risk propensities to the loss process are the same in past as in the future, so that all the differences in frequency and severity between past and future are explained by changes in risk measurements and environmental variables. Extensions to the model allow for risk propensities and risk characteristics to evolve according to a hidden-Markov model. Another extension is to allow time-dependent rates for the Poisson processes generating the ground-up losses. This may be necessary if forecasts of total claims for partial-year periods are required in order to deal with seasonality issues. Allowing for seasonally changing rates also allows for slightly more precision in estimating the claims process. It should be noted that the existing model allows for the predicted claims for a risk (i) to be influenced by the number and amount of past claims for that same risk if coverage existed on that risk in the past.

In practice, loss distributions are parameterized by a small number of parameters—for example, F may be lognormal with parameters $\mu$ and $\sigma$, in which case $\mu_{Past}(i,j) = h\mu_j(\text{past risk measurements for } i, \text{past environmental variables}, \theta)$ $\mu_{Future}(i,j) = h\mu_j(\text{current risk measurements for } i, \text{current environmental variables}, \theta)$ $\sigma_{Past}(i,j) = h\sigma_j(\text{past risk measurements for } i, \text{past environmental variables}, \theta)$ $\sigma_{Future}(i,j) = h\sigma_j(\text{current risk measurements for } i, \text{current environmental variables}, \theta)$ The model uses finite mixtures of lognormal distributions in order to approximate a wider range of loss distributions than a single lognormal distribution can. In this case there are several values for $\mu$ and $\sigma$, one for each component, as well as a set of mixing parameters. The extension to the model is that now there are more functions, but each is still a known function with unknown parameters that are part of the collection of parameters $\theta$.

The method described does not specify the functions linking the risk measurements and environmental variables to the parameters of the compound process. Functions that have been shown to work well in practice include linear, log-linear and power functions, and nonlinear functions that are piecewise continuous such as piecewise linear functions and natural splines. Useful are functions of linear or nonlinear combinations of several variables, such as the ratio of value to square footage, or contents value to building value in the case of property risks.

To model the claims process, given a model for the ground-up loss process, it is necessary to apply terms of coverage, limits and deductibles to the modeled ground-up loss process.

If no coverage is in effect over an interval of time for a given risk, all losses generated by the ground-up loss process during that interval of time are not observed. Any losses below the deductible are not observed and any losses above the limit are capped at the limit. Because of the characteristics of the compound Poisson process, the claims process is also a compound Poisson process (during periods of coverage), with the rate of claims for risk i and loss type j being $\lambda(i,j) * Pr(X_{i,j} > \text{deductible}_i)$ where $X_{i,j}$ has the distribution given by $F_{i,j}$ and the size of the claims for risk i and loss type j having the same probability distribution of that of $\min(X_{i,j} - \text{deductible}_i, \text{polimit}_i)$ conditional on this quantity being positive.

Once the past claims process and the future claims process have both been specified in terms of two (related) compound Poisson processes, it is straightforward to write the likelihood functions for past claims and future claims using standard formulas. The function can be expressed in simple mathematical terms although the formula is lengthy when written. A single compound Poisson process has a likelihood function as shown by equation 54 in FIG. 4C, where "N" is the number of claims (above deductible), "$x_i$" are the sizes of the claims (after deductible), "$\lambda$" is the annual rate of the Poisson process, "z" is the number of years exposed to losses, and "f" is the probability density of the claim distribution (there is a simple modification for distributions with masses at a single point which occur when there is a limit).

Once $\theta$ is known, $\lambda$ and f can be calculated for each combination of risk and loss type for past claims. It is assumed that losses occur independently at each risk, conditional on $\theta$, so the past likelihood for the whole portfolio is just the product of factors, one factor for each combination of risk (i) and loss type (j), where each factor has the form given above, except that z, $\lambda$, and f depend on (i, j) and N is replaced by N(i, j) which is the number of past claims for risk (i) and loss type (j). The same process produces the likelihood for future claims (z, $\lambda$, and f may be different in the future likelihood function than in the past likelihood function even for the same risk and loss type).

The remaining portion of the general formula involves the prior probability distribution $p(\theta)$. This is obtained through expert elicitation, as at Step 100. Where there is sufficient loss/historical and/or current data, the effect of $p(\theta)$ tends to be small. However, in the collection of parameters given by $\theta$ there may be some parameters (such as the frequency of loss for a particular class of business with a small exposure) for which there is little claim data, in which case these parameters will be more sensitive to the expert opinion incorporated in the prior distribution $p(\theta)$.

Once the past and future likelihood functions and the prior distribution $p(\theta)$ have been specified/determined, the probability distribution of predicted claims can be obtained by solving the predictive model integral given above. This produces a probability distribution for the predicted claims for each risk and each type of loss in the future portfolio, given coverage assumptions. Solving this sort of integral is a central topic of Bayesian computation and is the subject of extensive literature. In general, numerical techniques are required, a popular simulation method being Markov Chain Monte Carlo. An alternative procedure is to obtain the maximum likelihood estimate of θ, which is the value of θ that maximizes the past likelihood function. Since all the quantities besides θ in the past likelihood function are known (these are past claims, past coverages, past risk measurements, and past environmental variables), this function, namely $$p(cl0|cv0,rm0,ev0,\theta)$$

can be maximized as a function of θ. It is known that under most conditions and given enough data, the likelihood, as a function of θ, can be approximated by a multidimensional quadratic surface. Experience using the procedure with real data reinforces this theoretical finding. If this is the case, then the probability distribution of θ, given the past data, can be approximated as a multivariate Normal distribution. A further approximation uses the mean of this multivariate Normal distribution as the single point estimate of θ (the Bayes posterior mean estimate).

Given a single point estimate of θ, the predictive distribution of future claims is straightforward to calculate, since it is given by the future likelihood. The predicted future ground-up losses are given by a compound Poisson process whose parameters are given in the simplest case by $$\lambda_{Future}(i,j)=g_j(\text{current risk measurements for } i, \text{current environmental variables}, \theta)$$

$$\mu_{Future}(i,j)=h\mu_j(\text{current risk measurements for } i, \text{current environmental variables}, \theta)$$

$$\sigma_{Future}(i,j)=h\sigma_j(\text{current risk measurements for } i, \text{current environmental variables}, \theta)$$

where θ is set to the Bayes posterior mean estimate, and the claims compound Poisson process is obtained by applying deductible and limit adjustments as described previously.

If the predicted annual average loss (after deductible and limit) is desired for risk (i) and loss type (j), and if the posterior mean estimate is being used, then the average annual loss is given by $$\lambda(i,j)*Pr(X_{i,j}>d_i)*E(\min(X_{i,j}-d_i,l_i)|X_{i,j}>d_i)$$

where "d" and "l" refer to deductible and limit respectively. If the severity distributions are given by mixtures of lognormals, then this formula can be easily calculated. If a single point estimate of θ is not desirable, then the posterior distribution of θ can be approximated by a finite distribution putting probability on a finite set of points. In this case the average annual loss is given by a weighted sum of terms like that above. In either case, the predictive modeling procedure produces a calculation that can be done quickly by a computer, and does not require simulation. Calculation of average annual losses by layer is also straightforward.

The method/system 10 may be implemented using a computer or other automated data processing or calculation device, using standard programming techniques.

The following sections provide an additional example for purposes of further demonstrating basic aspects of the method of the present invention. The example is simplified for brevity and to minimize the need to display the complex mathematical formulas that are used to describe the method in a more general sense, as shown above. Production applications of the method may be more complicated than the present example. However, in the course of describing the example, more general aspects of the method are touched upon when they can be described without using complex formulas. Some standard technical terms from the field of applied probability are used.

Generally, the method is a specific application of Bayesian analysis, a technique of statistics, in which an attempt is made to use all sources of information, including scientific models, the quantified opinion of experts, and hard/known data. The advantage of this approach is that expert opinion can be used to supplement data analysis when there is little data to answer some crucial question. For example, there may be no historical data available to determine how loss experience differs according to the answer on a property survey question that has not been asked in the past. Bayesian analysis allows for a smooth transition from reliance upon expert opinion to reliance upon data, as that data becomes available. Bayesian analysis is also known to have good theoretical properties. For example, use of Bayesian analysis can mitigate the problem of "overfitting" associated with certain techniques in statistics and machine learning. Overfitting occurs when a model "trained" on a certain set of data reproduces "accidental" as well as "real" features of the data and therefore performs more poorly on subsequent data than would be expected on the basis of how well the model fit the training data. Overfitting is mitigated in Bayesian analysis by taking into account not only how well a model fits the existing data but also how reasonable the model is; for example, whether the effects are of reasonable magnitude, whether the directions of the effects are reasonable, and whether the curves used by the model are reasonably smooth or whether they fluctuate wildly from point to point.

Most simply, Bayesian analysis proceeds by building a probability model for all characteristics and quantities of interest—past, present and future, and known and unknown. The probability distribution for the unknown (e.g., future) quantities of interest conditional on the known data can be obtained by a conditional probability formula, such as:

$$\text{Prob(Future|Past Data)}=\text{Prob(Future \& Past Data)}/\text{Prob(Past Data)}.$$

Here, the quantity on the left-hand side is the conditional probability of future quantities of interest, given all the known data (past and present). Usually a set of model parameters is introduced that is designed to capture the underlying processes generating the future data. These parameters are usually a set of numbers but they could also be curves or probability distributions; the model can have a small number of parameters or it can be very complex to cover a large number of possible processes. Often it can be assumed that knowing the model parameters means that everything has been captured about the past data that is useful to predict the future data. In this case, $$\text{Prob(Future|Past Data)}=\text{SUM Prob}\\(\text{Future|Parameters})*\text{Prob(Parameters|Past Data)}$$

"SUM" means the action of summing (or integrating) over all the possible values for the model parameters. In this case, the prediction problem has been broken down into two pieces: (1) calculating the probability distribution of the future quantities of interest given knowledge of the model parameters, and (2) obtaining the probability distribution of the model parameters, given the data plus quantified expert opinion. The summation or integration can be difficult and time-consuming if predictions need to be generated in real time. The summed predictive distribution can be thought of as a weighted average of predictive distributions, each one associated with a different value for the model parameters. If the weight is high for one particular value of the model parameters, this summed distribution can be approximated by assuming that the weight is 100% for the most likely value of the model parameters, denoted by Parameters(Max), and zero for all other possible values of the parameters. In this case Prob(Future|Past Data)~Prob(Future|Parameters(Max)), where ~ denotes approximate equality. The present example uses this approximation.

In order to get an expression for Prob(Parameters|Past Data), the same type of conditional probability argument as before gives the formula:

Prob(Parameters|Past Data)=Prob(Parameters & Past Data)/Prob(Past Data)

=Prob(Past Data|Parameters)*Prob(Parameters)/Prob(Past Data)

This formula is known as Bayes' Theorem. The term on the right hand side of the equation is called the posterior probability distribution, or "posterior." The two factors in the numerator are called:

The "likelihood"=Prob(Past Data|Parameters)

The prior probability distribution, or "prior"=Prob(Parameters).

If the likelihood is higher for one set of parameter values and lower for a second set, it means that the past data actually observed is more likely under the first set of parameter values than under the second set. This generally means that the first set of parameters fits the past data better. In a sense, the likelihood measures how well a particular set of parameters "forecasts" the past that actually occurred. While there are many measures of how well a model fits the data, Bayesian analysis, as well as many other statistical procedures, uses likelihood to measure goodness of fit. The other factor—the prior probability—does not involve the past data and can capture expert opinion about the model parameters. The prior is typically developed before or without looking at the data that is to be used to produce the likelihood; this is to avoid "double-counting" the evidence from the past data. However, the prior can be produced as the output from a previous analysis using an independent set of data. In this case the posterior from the previous analysis becomes the prior for the current analysis. Where there is a lot of data, the likelihood will generally "dominate" the prior, in which case the shape of the posterior distribution depends mostly on the shape of the likelihood (which depends on the data) rather than the shape of the prior (which does not depend on the data). In other cases, there could be some parameters whose probability distribution is well determined by the data while other parameters are not. For example, if changing the value of a particular parameter causes little or no change in the likelihood, that indicates that there is little or no evidence in the data bearing on the value of that particular parameter. That would be true in the example mentioned above in which a new property survey item has been introduced.

In comparing the contributions of prior and likelihood, there are four basic cases to consider: (1) the likelihood dominates the prior because there is a lot of relevant data and some uncertainty in the prior expert opinion; (2) the prior dominates the likelihood because of a lack of relevant data and moderate or strong prior expert opinion; (3) both the likelihood and the prior are uninformative, in which the impact on decision making of this fundamental uncertainty must be assessed and ways of gathering more data could be considered; and (4) both the likelihood and the prior are informative, but they are inconsistent, that is, the data points to values for some parameters that are considered to be highly unlikely by prior expert opinion. The existence of (4) often points to a weakness in the overall model, such as leaving out important variables. In a real example, it was found that communities having a better ISO protection class had a higher rate of theft. A better protection class indicates better fire and police services. Expert opinion supported a relationship going in the other direction. The model was deficient in that the expert opinion did not allow for the effect of omitted variables, such as urban versus rural community structure: communities with worse protection tended more often to be rural communities with a lower overall crime rate, and the experts did not take this "surrogate" effect into account. In fact, this problem was solved by expanding the data available and using additional demographic variables. With this expanded data included in the likelihood, the effect of protection class on crime was reversed to agree with the original expert opinion.

Returning to the present example, suppose that it is desired to forecast or predict the losses associated with an insurance book of business. That is, it is desired to produce a probability distribution for future losses, given the data available at the time of the forecast. The probability distribution of the total losses by account over the contract period may be of interest, rather than the probability distribution of the timing and amount of each individual claim; however the former may be calculated or simulated given the latter. The risk modeling method is designed to simultaneously model multiple types of risk, such as general liability, worker's compensation, and property losses. Within property losses, for example, it would be usual to simultaneously model causes of loss such as fire and lightning, wind and hail, water damage, and theft. For each of these categories, one might simultaneously model property damage, business interruption, loss adjustment expenses, and other elements. Suppose it is desired to model only fire claims and only the property damage portion of those claims.

For this example, suppose historical fire claims for a collection of accounts is available. If these claims are not fully developed, they will need to be developed using actuarial techniques. This may be done outside the model or inside the model, in which case additional elements like development curves can be added to the model and development curve parameters can be simultaneously estimated along with the other parameters through the Bayesian analysis of the model. Claims may need to be adjusted for price changes and otherwise de-trended, again, inside or outside the model.

A property account will typically be structured as follows: each account will have one or more locations, and each location will have one or more buildings. For fire loss property damage, the analysis and prediction should be done at the building level, since property damage from fire is typically localized at the building level (although fire can spread between buildings at a given location). In order to perform a straightforward building-level analysis, claims histories need to be tied to individual buildings.

Information on each building can come from several sources—such as from agents or company salespeople, from loss prevention or inspection personnel, or from outside vendors. Assume for this example that claims histories are available at the building level. Assume also that only fire claims are examined for the example, although non-fire claims may turn out to help predict fire claims (and vice versa) and a simultaneous analysis of multiple claim types should be performed to test this possibility in a real modeling situation. Addresses will almost always be available at the location, and these addresses can be used in tying to the building a potentially vast amount of information that is available on the town, zip code, census tract, or other geographic entity in which the building is located. This could be economic, social, or environmental information from public sources or private vendors. Additional information could also be tied into the building level from the account level, such as business, credit or insurance data on the owners or tenants of the building and data on the agent producing the business for that account. Property surveys may generate additional data at the building level. In total, there may be dozens of characteristics available for some buildings. Typically, there is a good deal of missing information, which is handled in a straightforward way using Bayesian analysis. Much of the information may also be inaccurate or erroneous. Elements can be introduced into the Bayesian model to mitigate or at least quantify the effects of bad data.

Assume in the example that the data is complete and leave aside the issue of its accuracy. Building characteristics that are almost always available include total insured value (TIV), occupancy type, construction class, year built, number of stories, protection class, and sprinkler protection. Square footage and other highly useful characteristics may also be available.

As described above in more detail, the method involves creating a likelihood function and a prior. The likelihood function, in its most basic form, is constructed as follows. Past and future ground-up losses (in the case of the example, fire losses) are modeled as generated by a Poisson process with unknown rate that is characteristic of the individual risk (in this example, the building is the risk). A Poisson process is the accepted representation of events happening "at random" in time. This assumption is reasonable provided seasonal effects, weekly patterns, and other types of change over time are not modeled. There are other situations in which a more complex model of the occurrence of losses over time may be needed. The amounts of the ground-up losses are modeled as independently and identically distributed random variables drawn from an unknown severity distribution that is also characteristic of the individual risk. The actual claims paid are the ground up losses minus the applicable deductible for the building's policy and capped at the limit for the building's policy. The basic model assumes that below-deductible or denied claims are ignored in the analysis.

The next level of simplification assumes that the severity distribution depends on the known characteristics of the building and not the actual identity of the building. That is, two buildings that are identical according to the known characteristics have the same (unknown) severity distribution. If the same simplification is made on the frequency side, a useful feature of the model is lost, which is the ability to quantify "accident-proneness" of buildings and apply experience modifiers to individual buildings on the basis of their claims histories. This can be done provided the unknown frequency distribution for a given building depends on the claims as well as the known characteristics of the building such as occupancy, construction, and so on.

In building-level property risk modeling, modifications based on building claims experience may not be as necessary as, for example, in the case of personal auto or worker's compensation insurance. For the simple example, assume that the probability distribution of the number of claims over a 1-year period is Poisson with a rate that depends on the building's characteristics. A more general model would assume a negative binomial distribution for the number of claims whose scale parameter depends on the building's characteristics. Assume that the severity distribution is lognormal with a scale factor that depends on the building's characteristics. Both the negative binomial and lognormal distributions also have shape parameters that are assumed to be the same for all buildings in order to simplify the model. The functions linking the building characteristics to the frequency and severity scale parameters as well as the shape parameters are to be estimated from the data and combined with expert opinion using Bayesian analysis techniques.

A simple model linking the frequency and severity scale parameters to building characteristics is a multiplicative model. This can be thought of as a generalized additive model ("GAM") for the logarithm of the quantity to be modeled (in this case the scale factors for frequency and severity). A GAM is formed by adding terms together, each term depending on one or a few of the explanatory variables in the model. The terms themselves are often nonlinear functions of a single explanatory variable and the nonlinear functions as well as the coefficients used when adding them together are both adjusted through a computer algorithm to fit the data. For example, a model produced by multiplying together modification factors for each variable is a simple multiplicative model in this sense. A GAM is a generalization of a linear model. Often a linear model is inadequate; for example, it is unlikely that the effect of building age on frequency and severity can be modeled with a simple curve. Instead, the curve might be made up of line segments forming a continuous curve in which the slopes of the segments and the points at which the slope changes are adjustable parameters.

The elements needed to construct the likelihood function are now all available: (1) the forms of the frequency and severity probability distributions; (2) the models linking the parameters of the frequency and severity distributions to the building characteristics and the adjustable parameters for those models; (3) building characteristics for all the buildings; (4) exposure data such as effective and expiration dates for all the buildings; (5) claims histories; and (6) the assumption that claims occur independently. Although the likelihood function is not shown here since it is a complicated formula (see the examples above), a probability modeler can construct a likelihood function based on an expanded version of the description above using standard calculations.

The other element needed for the Bayesian analysis is the prior. Assuming that the prior comes from eliciting expert opinion, and not from a previous analysis to be updated, the prior is elicited using a structured procedure. Where it is known that the likelihood will dominate the prior because there is a lot of relevant data, it may be sufficient to use "neutral" priors. Where the prior will have a major impact on the analysis, it is important to quantify the range of uncertainty for each parameter. This uncertainty can be captured by specifying the appropriate distributions. For example, suppose one of the parameters in the model is a frequency multiplier for fire claims that applies if maintenance and housekeeping meets the criteria for "poor." A prior probability distribution for this parameter might be lognormal, with 10th percentile equal to 1.05 and 90th percentile equal to 1.6. It is important to qualify experts in terms of which parts of the prior they should contribute. For example, claims experts may be given more input on the prior probability distributions for the severity parameters than for the frequency parameters.

Since certain changes may be made in the above-described method of risk modeling by estimating frequencies of loss and loss distributions for individual risks in a portfolio, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A computer system for generating a forecast loss probability distribution for at least a first insurance risk, the system comprising:

an electronic data storage device configured to store data describing one or more portfolios of insurance risks, the data for each insurance risk including at least measured characteristics, environmental variables, expert opinion parameters, historical loss data, historical policy coverage, and current policy coverage; and a computer processor configured to compute a forecast loss probability distribution for at least a first insurance risk selected from the one or more portfolios of insurance risks, wherein the forecast loss probability distribution is computed by:

constructing a first historical loss likelihood function for the first insurance risk, based on compound Poisson processes describing the historical loss data according to at least a historical loss frequency distribution and a historical loss severity distribution for a first loss type associated with the first insurance risk, wherein each Poisson process is a function of at least the measured characteristics and the environmental variables for the first insurance risk, according to the expert opinion parameters for the first insurance risk;

constructing a similar historical loss likelihood function for each of one or more other insurance risks in the same portfolio as the first insurance risk;

updating at least the first historical loss likelihood function according to a Bayesian predictive model incorporating the historical loss data for each of the one or more other insurance risks, adjusted by the historical loss likelihood function for each of the one or more other insurance risks; and storing the updated first historical loss likelihood function on the electronic data storage device as the forecast loss probability distribution for the first insurance risk.

2. The computer system according to claim 1, wherein the computer processor is further configured to adjust the forecast loss probability distribution for the first insurance risk according to the current policy coverage for the first insurance risk, and to store the adjusted forecast loss probability distribution on the electronic data storage device as a forecast claims probability distribution.

3. The computer system according to claim 1, wherein the computer processor is further configured to generate the historical loss data based on historical claims and historical policy coverage data.

4. The computer system according to claim 1, wherein the expert opinion parameters for each insurance risk are expressed in terms of a parameter probability distribution.

5. The computer system according to claim 4, wherein the parameter probability distributions are based on the measured characteristics for each insurance risk.

6. The computer system according to claim 5, wherein the Poisson processes are formed by combining lognormal probability distributions according to the expert opinion parameter probability distributions.

7. The computer system according to claim 1, wherein each insurance risk is associated with a person.

8. The computer system according to claim 1, wherein each insurance risk is associated with a location.

9. The computer system according to claim 1, wherein the processor is configured to update each historical loss likelihood function in the portfolio of the first insurance risk according to a Bayesian predictive model incorporating the historical loss data for each of the other insurance risks in the portfolio, adjusted by the historical loss likelihood function for each of the other insurance risks in the portfolio.

10. A computer system for generating a forecast loss probability distribution for at least a first insurance risk, the system comprising:

an electronic data storage device configured to store data describing one or more portfolios of insurance risks, the data for each insurance risk including at least expert opinion parameters, historical loss data, historical policy coverage, and current policy coverage; and a computer processor configured to compute a forecast loss probability distribution for at least a first insurance risk selected from the one or more portfolios of insurance risks, wherein the forecast loss probability distribution is computed by:

constructing a first historical loss likelihood function for the first insurance risk, based on compound Poisson processes describing the historical loss data according to at least a historical loss frequency distribution and a historical loss severity distribution for a first loss type associated with the first insurance risk, wherein each Poisson process is a function according to the expert opinion parameters for the first insurance risk, and the expert opinion parameters for each insurance risk are expressed in terms of a parameter probability distribution;

constructing a similar historical loss likelihood function for each of one or more other insurance risks in the same portfolio as the first insurance risk;

updating at least the first historical loss likelihood function according to a Bayesian predictive model incorporating the historical loss data for each of the one or more other insurance risks, adjusted by the historical loss likelihood function for each of the one or more other insurance risks; and storing the updated first historical loss likelihood function on the electronic data storage device as the forecast loss probability distribution for the first insurance risk.

* * * * *